United States Patent
DeCenso et al.

(10) Patent No.: US 7,913,853 B2
(45) Date of Patent: Mar. 29, 2011

(54) RF SHIELDING GASKET FOR VIBRATORY SEPARATOR

(75) Inventors: Anthony J. DeCenso, Cincinnati, OH (US); Michael Timmerman, Cincinnati, OH (US)

(73) Assignee: M-I L.L.C., Houston, TX (US)

( * ) Notice: Subject to any disclaimer, the term of this patent is extended or adjusted under 35 U.S.C. 154(b) by 437 days.

(21) Appl. No.: 11/415,567

(22) Filed: May 2, 2006

(65) Prior Publication Data

US 2006/0260987 A1 Nov. 23, 2006

Related U.S. Application Data

(60) Provisional application No. 60/677,096, filed on May 3, 2005.

(51) Int. Cl.
*B07B 1/49* (2006.01)
(52) U.S. Cl. .......................... 209/405; 209/286; 209/347
(58) Field of Classification Search ................. 209/286, 209/347, 405
See application file for complete search history.

(56) References Cited

U.S. PATENT DOCUMENTS

| 4,929,346 | A | | 5/1990 | Si-Lin |
| 5,456,365 | A | * | 10/1995 | Janssens et al. ............. 209/403 |
| 5,996,807 | A | | 12/1999 | Rumpf et al. |
| 6,543,621 | B2 | * | 4/2003 | Baltzer et al. ............... 209/405 |
| 6,585,116 | B1 | | 7/2003 | Doelle et al. |
| 6,997,325 | B2 | | 2/2006 | DeCenso et al. |
| 2004/0129612 | A1 | * | 7/2004 | DeCenso ..................... 209/309 |
| 2004/0245154 | A1 | * | 12/2004 | Baltzer et al. ............... 209/405 |

OTHER PUBLICATIONS

International Search Report dated Sep. 28, 2006 for PCT/US2006/016663 filed May 2, 2006.

* cited by examiner

*Primary Examiner* — Stefanos Karmis
*Assistant Examiner* — Kalyanavenkateshware Kumar

(57) ABSTRACT

A gasket for a shaker screen in a vibratory separator includes an outer peripheral section including an end section from which a upper lip segment and a lower lip segment project inward to generally define a U-shaped channel, wherein the outer peripheral section is formed from an electrically conductive elastomeric material, a partial upper lip projecting inward from the upper lip segment, wherein the partial upper lip is formed from a white elastomeric material, and a partial lower lip projecting inward from the lower lip segment, wherein the partial lower lip is formed from a white elastomeric material.

4 Claims, 4 Drawing Sheets

RF SHIELDING GASKET FOR VIBRATORY SEPARATOR

This application claims priority to U.S. Provisional Patent Application Ser. No. 60/677,096 filed on May 3, 2005 entitled, "RF Shielding Gasket for Vibratory Separator" incorporated herein by reference for all purposes.

BACKGROUND OF INVENTION

Separator systems are used in industry for a variety of undertakings. They are used to process dry materials and liquid/solid slurries. Each one typically functions by first introducing a flow of material to a porous element such as a screen or filter, usually of woven wire mesh or a porous membrane. The flow of material is separated into two streams, one containing material that passes through the porous element, the other containing material that is rejected by the porous element. A drive mechanism may be operatively coupled with a housing to produce a vibrating motion that serves to put the material on the porous element in motion until it either passes through or is pushed off the element at the periphery thereof. Other devices use pressure to increase flow through a membrane with cycled application including reverse flow to clear the rejected material.

Such separator systems employ screens in rectangular and circular forms with screen elements tensioned on frames or with hooks tensioned on the separator itself. The screen elements range greatly in porosity and can be of a single element or of laminated elements. The separator frames can be vibratory or fixed and, when vibratory, supported by a variety of means such as springs, bushings or links. Such systems alternatively employ filters, tensioned or untensioned, supported or unsupported and of widely varying porosities and shapes including rectangular, circular, cylindrical and bag shaped. Many additional features are, of course, available such as housing covers, elaborate manifolds and various and changeable motions, rates and cycles. Patents disclosing a small sampling of such systems and components include U.S. Pat. No. 4,022,693; U.S. Pat. No. 4,251,354; U.S. Pat. No. 4,582,597; U.S. Pat. No. 4,613,432; U.S. Pat. No. 4,655,911; U.S. Pat. No. 4,968,366; U.S. Pat. No. 5,032,210; U.S. Pat. No. 5,051,171; U.S. Pat. No. 5,134,893; U.S. Pat. No. 5,221,008; U.S. Pat. No. 5,226,546; U.S. Pat. No. 5,242,058; U.S. Pat. No. 5,255,789; U.S. Pat. No. 5,265,730; U.S. Pat. No. 5,271,504; U.S. Pat. No. 5,456,365; U.S. Pat. No. 5,950,841; U.S. Pat. No. 6,089,380; U.S. Pat. No. 6,202,856; U.S. Pat. No. 6,349,834; U.S. Pat. No. 6,431,368; and U.S. Pat. No. 6,513,665, the disclosures of which are incorporated herein by reference.

Materials typically screened vary considerably in their particle size, bulk density, chemical composition, temperature, moisture content and other physical and chemical characteristics. Any particular separator system in a given processing plant is likely dedicated to handling a single material with consistent properties. Examples of such materials, to show the diversity but not to provide a comprehensive list, include: abrasives, activated carbon, calcium carbonates, ceramic slurries, chlorine compounds, citric acid, fertilizers, flours, food products, gunpowder, minerals, paper coating slurries, pharmaceuticals, pigments, polystyrene beads, powdered metals, powdered paints, printing inks, PVC powder, refractories, rocket propellants, and starches.

As a result, various screen configurations, vibration profiles and environments are employed to maximize efficiency and the quality of the resulting processed materials.

By far the most common failure mode for separator systems is the failure of the porous element. Screens, for example, are typically made of finely woven wire cloth drawn taut by a screen frame or tensioning apparatus on the separator. Failure is caused by numerous factors such as wear and fatigue failure. Such failures typically occur as breaks in the screening media itself resulting in a damaged screen. Such breaks may manifest themselves as tears (a series of mutually adjacent broken wires), punctures (tears in two directions) or holes (missing portions of the screening material). Once the screen has failed, the function of a separating system is compromised. At a minimum, it can no longer be relied upon to reject all oversized material because such material can now pass through the break in the screen. Worse, it can result in fragments of the failed screen contaminating the material being screened, presenting a serious hazard in food or pharmaceutical screening operations. Similar failure occurs in filter elements.

A system to detect breaks in porous elements has been developed using RF signals. Such a system is described in pending U.S. patent application Ser. No. 10/668,114 filed on Sep. 22, 2003 incorporated herein by reference. A signal system is employed with a vibratory material separator to define a separator system. The signal system includes a signal transmitter and a signal receiver located to either side of a screen in the separator. The signal system and the components thereof operate in the RF (radio frequency) range and, more practically given the size of the preconfigured interstices of commercial screens, operate in the higher end of the RF range in the microwave range, with the signal system, the transmitter and the receiver being microwave elements. The signals are understood to fall in the range of 700 megaHz to 50 gigaHz with specific empirical tuning to match the characteristics of the screen employed.

The signal source recognizes a change in a physical state of the screen when a break occurs through the received RF signal to the receiver and generates a signal as may be desired by the operator, to sound an alarm, to open the power switch to the separator, etc.

Gaskets are typically used at the interface of a screen frame and vibratory separator housing members. The gaskets used are usually made from an RF transmissible material, thereby permitting RF signals to pass through the gasket. Further, the thickness of the gasket separates the conductive components of the housing and screen frame by a distance sufficient for an RF signal to be transmitted through the gasket between the conductive, RF shielding, components. Thus a signal, typically indicative of a break in the porous element, may be detected by the receiver although the porous element remains intact. It is therefore desirable to provide an RF shield between the screen frame and the housing components of the vibratory separator to prevent such false detection. When pharmaceuticals and food are to be processed by the vibratory separator, the material from which the gasket used to seal the screen and the housing is made may have to meet certain requirements. Typically, the portion of the gasket that potentially comes into contact with the pharmaceuticals or food being processed is preferred to be made from a white elastomer. As the processing of food and pharmaceuticals is often more heavily regulated and implements more stringent requirements than other industries, it would be an improvement in the art to have a gasket that can shield RF signals while meeting requirements and regulations for food processing equipment.

SUMMARY

In one aspect, the invention relates to a gasket for a shaker screen in a vibratory separator, the gasket including an outer peripheral section including an end section from which a upper lip segment and a lower lip segment project inward to generally define a U-shaped channel, wherein the outer peripheral section is formed from an electrically conductive elastomeric material, a partial upper lip projecting inward from the upper lip segment, wherein the partial upper lip is formed from a white elastomeric material, and a partial lower lip projecting inward from the lower lip segment, wherein the partial lower lip is formed from a white elastomeric material.

In another aspect, the invention relates to a screen assembly for a vibratory separator, the screen assembly including a rigid peripheral frame having an outwardly extending flange, wherein the flange has a flange upper surface and a flange lower surface terminating at a flange periphery, a screen cloth affixed to the peripheral frame, a gasket encapsulating a peripheral edge of the flange on the peripheral frame, wherein the gasket includes an outer peripheral section surrounding the flange periphery, wherein the outer peripheral section is formed from an RF shielding elastomeric material, an upper lip extending inward from the outer peripheral section to cover a portion of the flange upper surface, and a lower lip extending inward from the outer peripheral section to cover a portion of the flange lower surface.

In yet another aspect, the invention relates to a shielding system for a vibratory separator including a screen break detection system utilizing RF signals to detect breaks in a screen cloth, the shielding system including a first chamber including a cylindrical first housing frame, a cover over the first housing frame, and a screen assembly below the first housing frame, a second chamber including, a cylindrical second housing frame, a domed manifold below the second housing frame, and wherein the screen assembly is above the second housing frame, wherein the first housing frame and the second housing frame clamp together about the screen assembly, wherein the screen assembly includes a screen frame having a top mounting surface and a radially extending flange, at least one wirecloth affixed to the top mounting surface of the screen frame, a gasket encapsulating the flange of the screen frame, wherein the gasket is electrically conductive, and wherein the gasket and flange are mounted between the first housing frame and second housing frame.

Other aspects and advantages of the claimed subject matter will be apparent from the following description and the appended claims.

DETAILED DESCRIPTION

Figure 1:
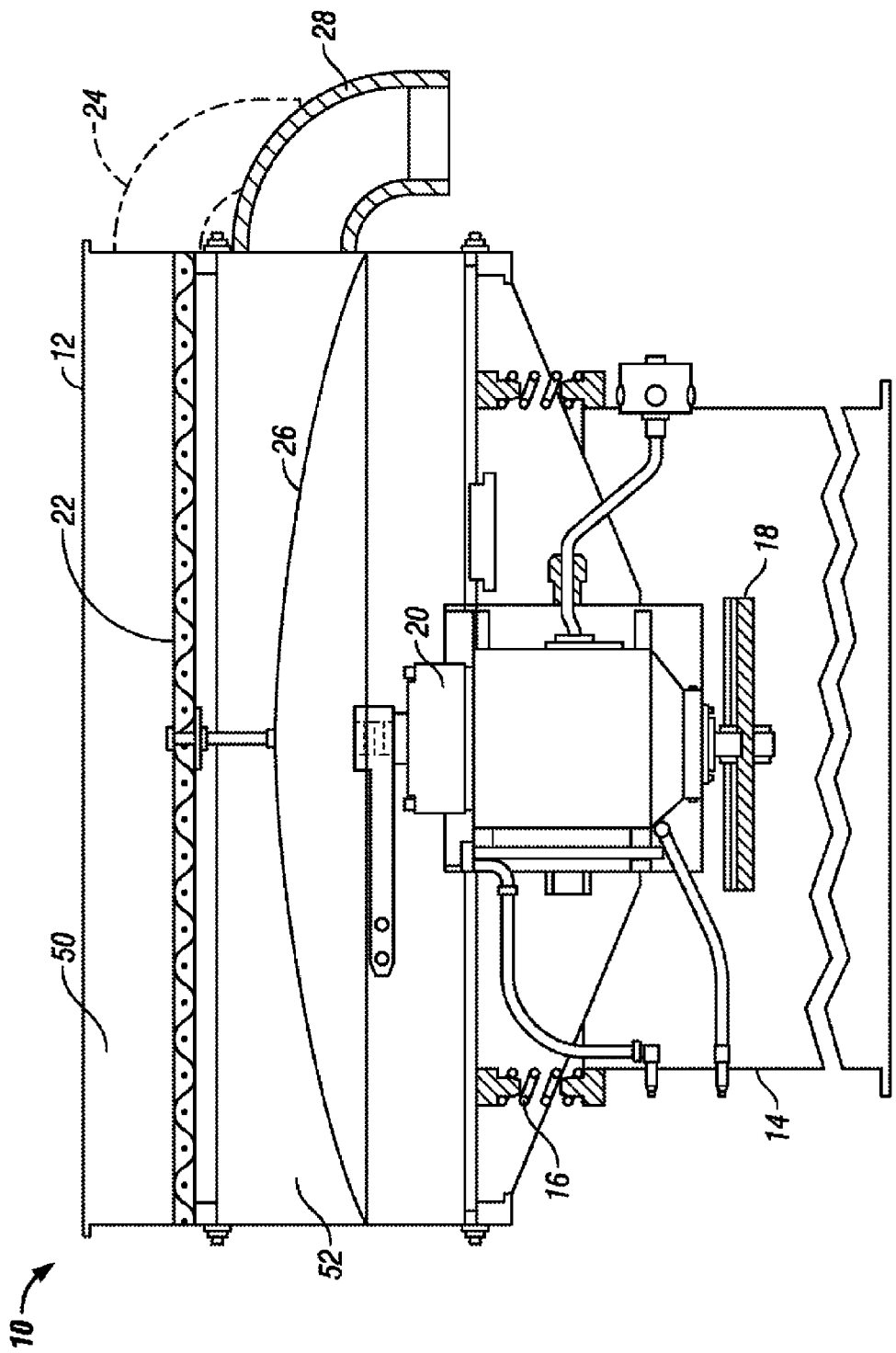
FIG. 1 is a side view of a vibratory separator.

Turning in detail to the drawings, FIG. 1 illustrates a conventional vibratory screen material separator, generally designated 10, to provide context for one material separation system for detecting breaks in a porous element. Nonvibratory screening systems and filtration systems in a range of such systems described above in the Background of the Invention can also find increased utility with a system for detecting breaks in the porous element employed for material separation.

The separator 10 includes a separator housing 12 which is elastically mounted to a base 14 on springs 16. A vibration generator 18 driven by a motor 20 causes the elastically mounted separator housing 12 to vibrate at an advantageous frequency and amplitude for material screening or filtering. A porous element, which is a screen 22 in this embodiment, extends across the separator housing 12 to separate material deposited thereon by selected characteristics. An overs outlet 24 may be present above the screen 22 while below the screen 22 may be a domed manifold 26 which feeds a throughs outlet 28.

Figure 2:
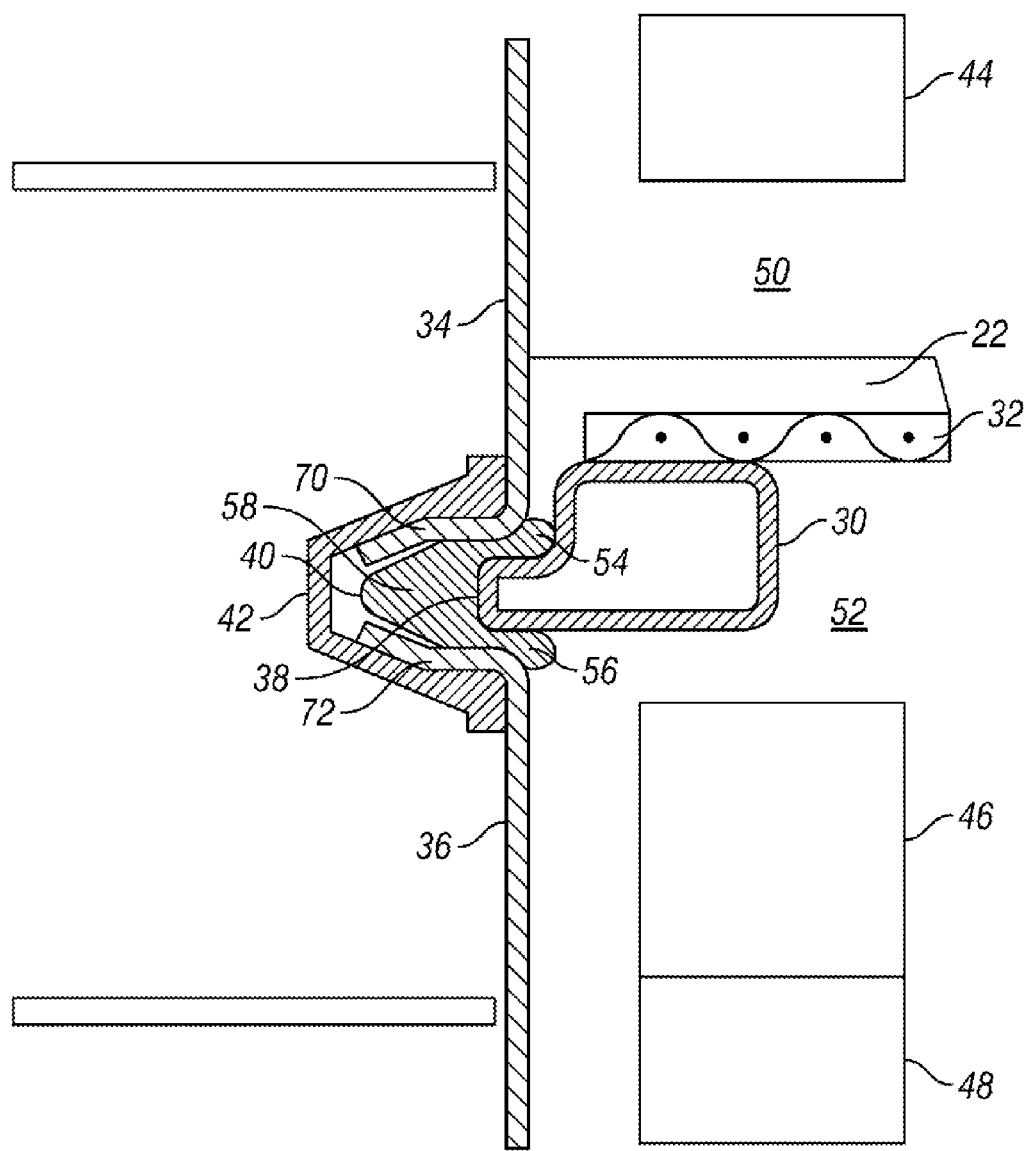
FIG. 2 is cross sectional view of an embodiment of an RF shielding gasket on a screen assembly in a vibratory separator.

Referring to FIG. 2, the seal arrangement and construction of the separator housing 12 about the screen 22 is illustrated. Also illustrated are details of the porous element, defined in this embodiment as a screen 22. The screen 22 includes a screen frame 30 which may be a formed metal ring. Screen cloth 32 is bonded to the screen frame 30 in a taut state. The screen cloth 32 is typically wire mesh of electrically conductive stainless steel. Preconfigured interstices are defined by the weave, the wire diameter and the wires per unit measure.

The separator housing 12 is shown to be of at least two cylindrical frames 34 and 36. These frames 34 and 36 come together about a flange 38 on the screen frame 30. As such, a screen mount is defined therebetween fully about the interior of the separator housing 12. A gasket 40 is positioned about the flange 38 and a clamp band 42 draws the entire assembly together. The entire separator 10 also is contemplated to include a cover with an inlet therein through which material is delivered to the screen 22.

Turning back to FIG. 1, in creating a first chamber 50 and a second chamber 52 within the separator housing 12 which includes a barrier to an RF signal, the frames 34 and 36 are electrically conductive. The cover (not shown) might also be electrically conductive, as well as the domed manifold 26 beneath the screen 22. The overs outlet 24 and the throughs outlet 28 can also be electrically conductive and further electrically conductive shielding as may be needed is contemplated to prevent transmission of the RF signals therethrough. The conductivity is provided through the employment of sheet metal components acting to create a barrier to the RF signals. Further, as will be described, the gasket 40 is electrically conductive to prevent the RF signals from flowing around the screen frame 30 within the screen mount.

Figure 4:
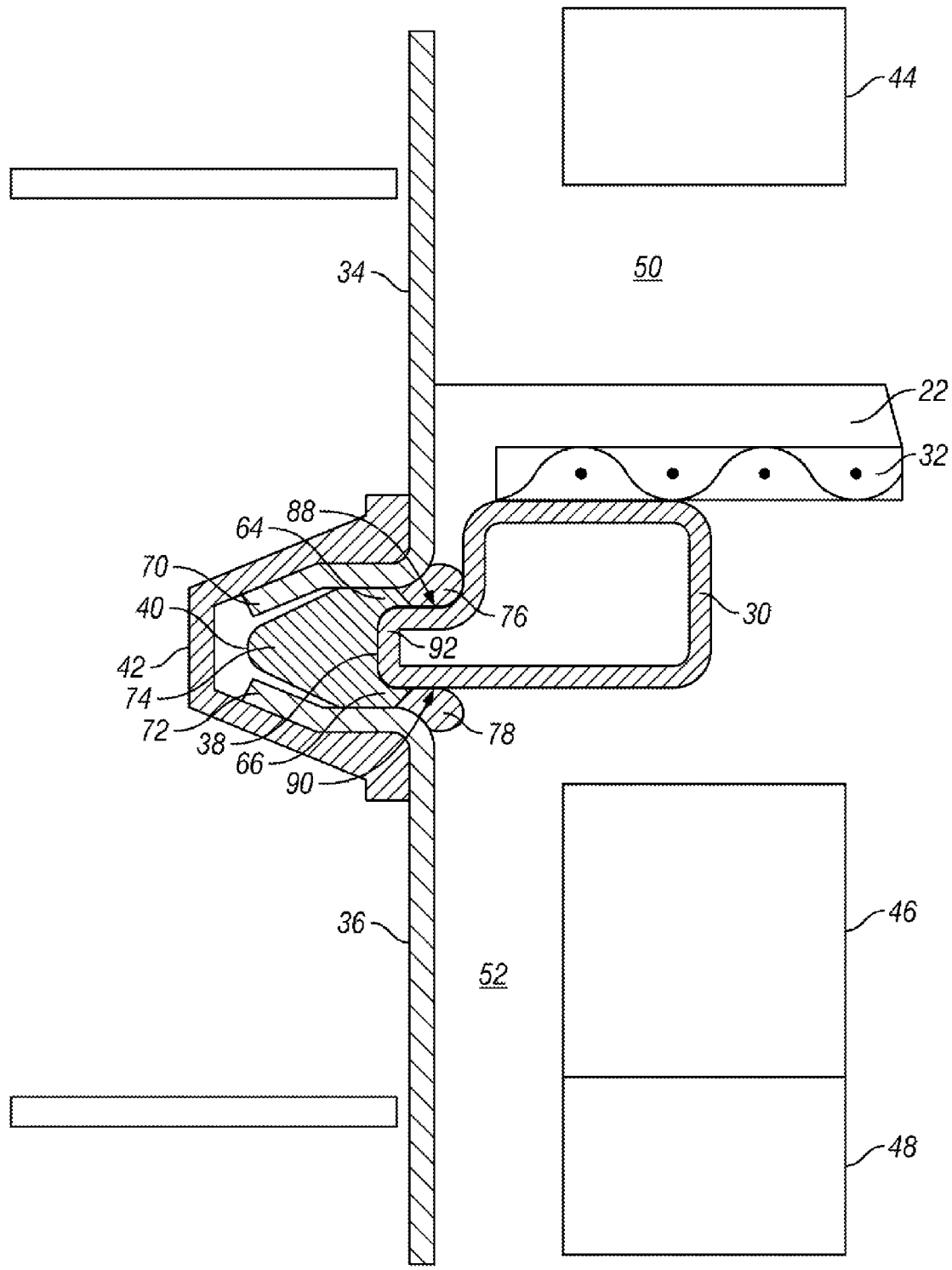
FIG. 4 is a cross sectional view of an embodiment of an RF shielding gasket on a screen assembly in a vibratory separator.

A signal system, illustrated in FIGS. 2 and 4 schematically, is employed with the vibratory material separator 10 (shown in FIG. 1) to define a separator system. The signal system includes a signal transmitter 44 and a signal receiver 46 located to either side of the screen 22. The transmitter 44 and the receiver 46 may be mounted to or relative to the first and second frame 34 and 36, respectively. The signal system and the components thereof operate in the RF (radio frequency) range and, more practically given the size of the preconfigured interstices of commercial screens 22, operate in the higher end of the RF range in the microwave range, with the signal system, the transmitter 44 and the receiver 46 being microwave elements. The signals are understood to fall in the range of 700 megaHz to 50 gigaHz with specific empirical tuning to match the characteristics of the screen 22 employed.

Also associated with the microwave signal receiver 46 is a signaling source 48. The signaling source 48 receives input from the receiver 46 and is actuated by the receiver 46 when the receiver 46 receives the microwave signal above a threshold. The threshold is established such that the signaling source 48 does not respond to any substantially attenuated signal passing through a screen 22 without breaks. At the same time, the threshold must also be such that the signaling source 48 is activated when a significant break occurs in the screen 22. Leakage of the RF signal around the screen 22 is to be reduced such that a threshold can be meaningfully set to be activated by a significant break. A significant break in the screen 22 is one that degrades the quality of the throughs resulting from the screening process and is more or less critically significant depending on the material processed. In the case of pharmaceuticals, the quality requirements are far stricter for the end product than in food processing, for example, and degradation in quality is measured by a more critical standard.

When the integrity of the barrier defined by the porous element, in this case the screen 22, fails in any manner which increases an opening size, the length of the resulting opening approaches the wave length of a microwave signal to the point where transmission through that opening can occur. Experiments have shown that detection is likely with the opening achieving one-quarter the wavelength. Screen failures are detected by exploiting this relationship between microwave transmission and electrically conductive barriers.

The signal source 48 recognizes the change in a physical state of the screen 22 when a break occurs through the received RF signal to the receiver 46 and generates a signal as may be desired by the operator, to sound an alarm, to open the power switch to the separator, etc.

Referring to FIGS. 1 and 2, between the two defined spaces 50 and 52, whether both form a chamber or only one forms a chamber with an RF barrier, a path exists through the screen mount. Without the screen 22, material to be processed has a clear path, as do the RF signals. The screen 22, positioned across this path in the screen mount defined by the separator housing 12 creates a selective path for material being processed according to selected characteristics. By selecting the appropriate RF signal, the screen 22 of conductive metal wire can act as a barrier to substantially attenuate, including to the point of virtual elimination, the RF signal passage along the path across the screen 22 so long as the preconfigured interstices of the unbroken screen remain intact. The screen 22 having interstices in the range of commercial screening systems is a barrier to RF signals in the microwave range. Other porous elements including screens and membranes which block microwaves in addition to woven wire screen cloth can be employed. As one example, electrically conductive coating on nonconductive substrates may adequately block RF signals in the appropriate range.

In the preferred embodiment, the porous element defined by the screen 22, which embodies a barrier across the path between the first and second chambers 50 and 52, is shown to extend in a plane. Instead, the porous element may extend into or out from the main volume of either the first or second chamber 50 or 52 as a filter bag or a cylinder, for example, and the path may, therefore, not necessarily be linear but pass through a porous element mount with the porous element extending fully across the path. The frame retaining the edges of the porous element may be fixed to the porous element as with the screen 22 or may be a mechanism with the separator housing 12, thus becoming part of the porous element mount.

In setting up the screen detection system, shielding is undertaken. Inherently, separators 10 provide a substantial amount of shielding as they are constructed almost entirely of electrically conductive material such as stainless steel alloys. The gasket 40 used between the screen frame 30 and the housing frames 34, 36 must provide a seal between the screen frame 30 and the housing frames 34, 36 as well as shield the space between the components from RF signals to completely prevent RF signals from traversing between chambers 50, 52 except through a broken screen.

It will be appreciated that the outer circumference of the screen frame 30 must be slightly smaller than the inner circumference of the housing frame 34 to ensure that the screen 22 fits within the separator housing 12. Tolerances associated with the manufacture of the separator housing 12 and the screens 22 can result in a gap between the screen frame 30 and the inner surface of the frame 34 of the housing 30.

The gasket 40 provides a sealed interface between each of the housing frames 34, 36 and the screen frame 30 to prevent product that is being sorted from bypassing the screen 22 or from becoming lodged between the housing frames 34, 36 or between the screen flange 38 and one of the housing frames 34 or 36. To retain the screen 22 in a desired location, each housing frame 34, 36 may include a radially extending flange as shown in FIG. 2, which provides surfaces to which a clamping mechanism 42 may be attached. The gasket 40 is located around the screen flange 38 which is mounted between the housing frames 34, 36. The gasket 40 is compressed between the flanges of the housing frames 34, 36 to further seal the interface between the housing members and the screen frame 30 by providing additional contact area.

Figure 3:
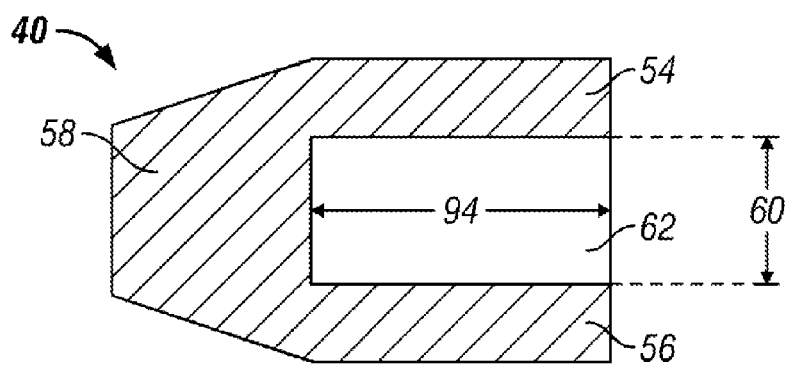
FIG. 3 is a cross sectional view of an embodiment of an RF shielding gasket.

Referring to FIGS. 2 and 3, in a first embodiment, the gasket 40 is made from an RF shielding material. The gasket 40 includes an upper lip 54 and a lower lip 56, each of which extend radially inward from an outer peripheral section 58. The upper lip 54 and the lower lip 56 are spaced apart by a distance 60 to form a U-shaped channel 62 with the outer peripheral section 58. The distance 60 between the upper and lower lips 54, 56 and the depth 94 of the channel 62 is sufficient to receive the flange 38 of the screen frame 30.

When the screen 22 is mounted to the separator 10, the outer peripheral section 58 of the gasket 40 is located between the flanges of the adjacent housing frames 34, 36. The upper lip 54 is compressed between the screen flange 38 and the adjacent housing frame 34, while the lower lip 56 is compressed between the screen flange 38 and the adjacent housing frame 36. Thus, the gasket 40 seals the interface between the screen flange 38 and the housing frames 34, 36.

The entire gasket 40 may be extruded or molded from an elastomer having conductive properties, thereby acting as a shield to RF signals. When the gasket 40 is compressed between the housing frames 34, 36 and the screen flange 38, RF signals are prevented from transmission out of the chamber 50 or 52 into which they are directed, unless a break in the screen cloth 32 has occurred. By being formed from a conductive elastomer, or an elastomer having sufficient conductive filler to block the transmission of RF signals, the gasket 40 provides an RF shield in the area between the screen flange 40 and the housing frames 34, 36.

In one embodiment, the electrically conductive elastomeric material is white. In one embodiment, the electrically conductive elastomeric material is substantially colorless. The term "colorless" as used herein refers to elastomeric material having little or no pigment or color added to the natural color of the polymer. Some residual color may be included, for example after an incomplete purge of a molding machine.

Figure 5:
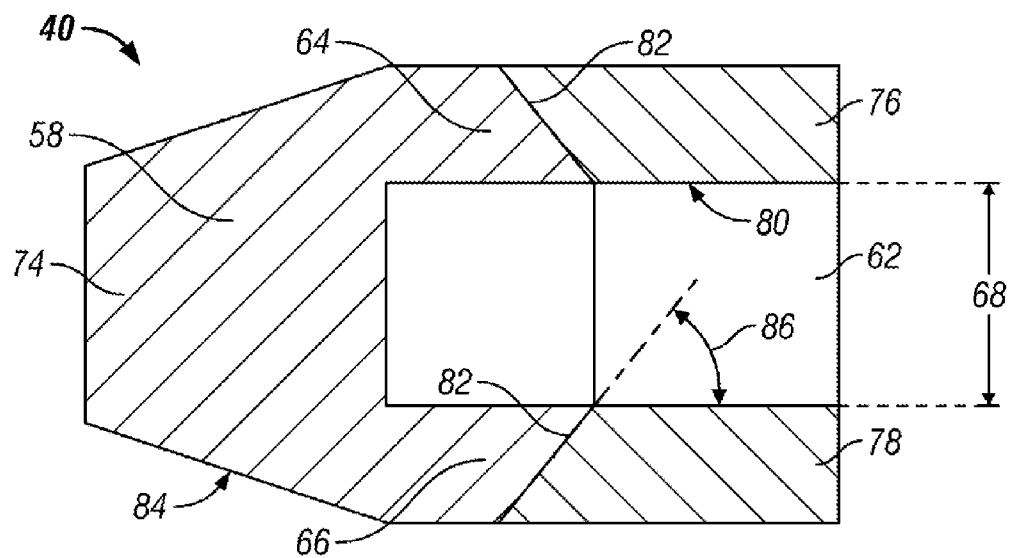
FIG. 5 is a cross sectional view of an embodiment of an RF shielding gasket.
Figure 6:
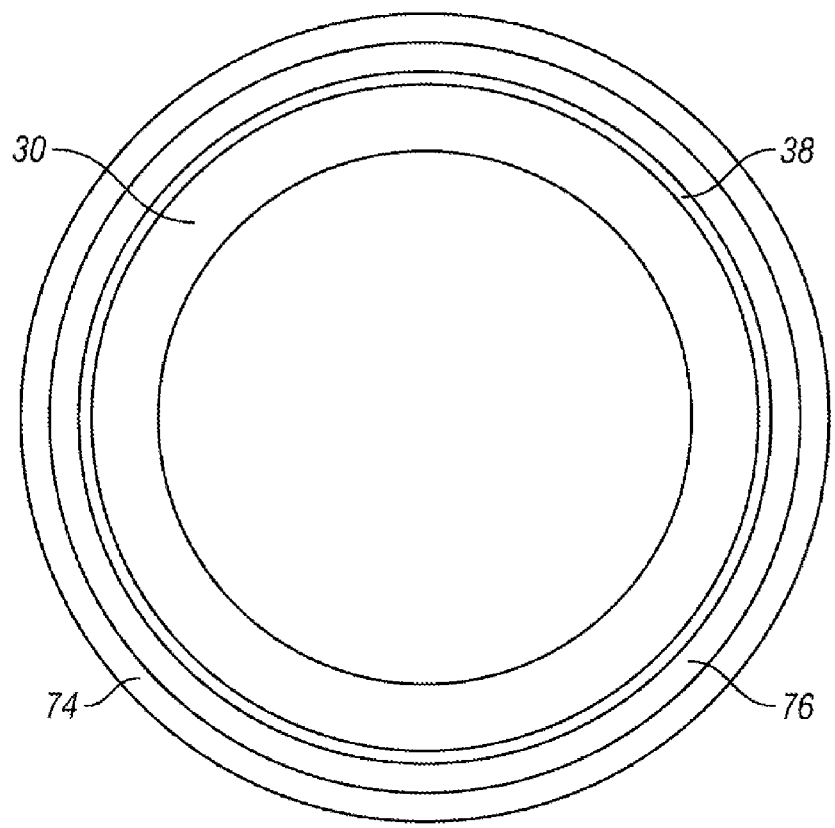
FIG. 6 is a top view of a screen assembly having an RF shielding gasket.

Referring to FIGS. 4-6, in one embodiment the RF-shielding gasket 40 includes an outer peripheral section 58, an upper lip segment 64, and a lower lip segment 66. As can be observed in FIG. 5, the upper lip segment 64 and the lower lip segment 66 are each contiguous with the outer peripheral section 58. The upper lip segment 64 and the lower lip segment 66 are separated by a distance 68 sufficient to receive the flange 38 of the screen frame 30.

The outer peripheral section 58 acts as a shield to RF signals, preventing their transmission therethrough. As depicted in FIG. 4, the outer peripheral section further seals the interface between much of the outer peripheral section of the flanges 70, 72 of the adjacent housing frames 34, 36 and the flange 38 of the screen frame 30. To both prevent RF signals from being transmitted through the outer peripheral section 58 and seal the screen mount area, an electrically conductive thermoplastic elastomer is used to form the outer peripheral section 58. Such material is not typically suitable for direct contact with food or pharmaceuticals during the separating process. As is discussed below, another material is used to form the areas potentially in contact with the product being processed through the separator.

In an embodiment of the gasket 40, shown in FIG. 5, the outer peripheral section 58 includes an end section 74, a partial upper lip 76 and a partial lower lip 78. The partial upper lip 76 and the partial lower lip 78 extend radially inward from the end section 74. As are the upper lip segment 64 and lower lip segment 66, the partial upper lip 76 and partial lower lip 78 are separated by the distance 68 sufficient to accommodate an outer portion of the flange 38 of the screen frame 30. As can be seen in FIG. 4, the partial upper lip 76 contacts the flange 38 along inner surface 80 and contacts the housing flange 38 along an outer surface 84. Likewise, the partial lower lip 78 contacts the flange 38 along inner surface 80 and contacts the housing flange 38 of housing frame 36 along outer surface 84. By wrapping around the outer edge of the flange 38, the outer peripheral section 58 provides an RF shield between the screen frame 30 and each housing frame 34, 36.

As was previously mentioned, the upper lip segment 64 and the lower lip segment 66 are preferably made from a material that may contact the product being separated. Preferably, a white elastomeric material is used to form the upper and lower lip segments 64, 66. A material that is approved for use in the production of food and pharmaceuticals is preferred, that is the upper and lower lip segments 64, 66 are preferably formed from a food-grade elastomer material.

Turning, again, to FIG. 5, it can be observed that the upper lip segment 64 is contiguous with the partial upper lip 76 of the outer peripheral section 58. Likewise, the lower lip segment 66 is contiguous with the partial lower lip 78 of the outer peripheral section 58. As the partial upper lip 76 and the partial lower lip 78 are preferably made from a different material than the upper lip segment 64 and the lower lip segment 66, a seam 82 is present at the interface between the partial upper lip 76 and the upper lip segment 64 as well as the partial lower lip 78 and the lower lip segment 66. The seam 82 extends from the inner surface 80 to the outer surface 84. In one embodiment, the seam 82 is formed at an angle 86 relative to the inner surface 80. The angle 86 provides maximum surface area of the upper and lower lip segments 64, 66 to be along the outer surface 84 of the gasket 40, where contact between the gasket 40 and the product being separated may be made. The angle 86 further provides maximum RF shielding material down each of the partial upper and lower lips 76, 78. The contact surface area of the two materials is also increased by angling the seam 82. Increasing the contact area increases the strength of the bond between the two materials.

The gasket 40 may be an extrusion in which the outer peripheral section 58 and the upper and lower lip segments 64, 66 are co-extruded. The extruded gasket 40 may be pushed onto the flange 38 around the screen frame 30. Alternatively, the gasket 40 may be molded onto the flange 38 of the screen frame 30 in an injection molding process. Alternatively, the gasket 40 may be molded in an injection molding process and pushed onto the flange 38, similar to the extruded gasket.

The screen assembly 22 including the RF shielding gasket 40 includes a rigid peripheral frame 30 from which a flange 38 radially extends. The flange 38 has an upper surface 88 and a lower surface 90, which each terminate at a flange periphery 92 distal the remaining portion of the screen frame 30. The screen cloth 32 is affixed to the screen frame 30. The gasket 40 encapsulates the peripheral edge of the flange 38. The gasket 40 structure is as previously described.

While the claimed subject matter has been described with respect to a limited number of embodiments, those skilled in the art, having benefit of this disclosure, will appreciate that other embodiments can be devised which do not depart from the scope of the claimed subject matter as disclosed herein. For example, a vibratory drier or material conditioning apparatus utilizing vibrating screens to both convey material and expose the material to predetermined environmental conditions may benefit from a screen break detection system in which RF signals are used. Such a drier or conditioning apparatus may further benefit from an RF shielding gasket having portions made from a benign elastomer where those portions could contact the material being processed. Accordingly, the scope of the claimed subject matter should be limited only by the attached claims.

What is claimed is:

1. A screen assembly for a vibratory separator comprising:
  a rigid peripheral frame having an outwardly extending flange, wherein the flange has a flange upper surface and a flange lower surface terminating at a flange periphery;
  a screen cloth affixed to the peripheral frame;
  a gasket encapsulating a peripheral edge of the flange on the peripheral frame, wherein the gasket comprises:
  an outer peripheral section surrounding the flange periphery, wherein the outer peripheral section is made from an elastomer having a filler material, said filler material being sufficiently conductive to block transmission of RF signals;
  an upper lip extending inward from the outer peripheral section to cover a portion of the flange upper surface; and
  a lower lip extending inward from the outer peripheral section to cover a portion of the flange lower surface;
  wherein the outer peripheral section comprises:
  an upper lip segment projecting inward to partially cover the flange upper surface; and
  a lower lip segment projecting inward to partially cover the flange lower surface;
  wherein the upper lip includes a partial upper lip projecting inward from the upper lip segment and contiguously formed therewith and the lower lip includes a partial lower lip projecting inward from the lower lip segment and contiguously formed therewith;
  wherein the partial upper lip and the partial lower lip are each formed from a white elastomeric material, said partial upper lip and said partial lower lip being made from a different material than the upper lip segment and the lower lip segment; and
  wherein the outer peripheral section, the partial upper lip, and the partial lower lip are co-extruded.

2. A screen assembly for a vibratory separator comprising:
  a rigid peripheral frame having an outwardly extending flange, wherein the flange has a flange upper surface and a flange lower surface terminating at a flange periphery;
  a screen cloth affixed to the peripheral frame;

a gasket encapsulating a peripheral edge of the flange on the peripheral frame, wherein the gasket comprises:
  an outer peripheral section surrounding the flange periphery, wherein the outer peripheral section is made from an elastomer having a filler material, said filler material being sufficiently conductive to block transmission of RF signals;
  an upper lip extending inward from the outer peripheral section to cover a portion of the flange upper surface;
  a lower lip extending inward from the outer peripheral section to cover a portion of the flange lower surface;
  wherein the outer peripheral section comprises:
    an upper lip segment projecting inward to partially cover the flange upper surface; and
    a lower lip segment projecting inward to partially cover the flange lower surface;
    wherein the upper lip includes a partial upper lip projecting inward from the upper lip segment and contiguously formed therewith;
    wherein the lower lip includes a partial lower lip projecting inward from the lower lip segment and contiguously formed therewith; and
    wherein the partial upper lip and the partial lower lip are each formed from a white elastomeric material;
wherein the partial upper lip and the partial lower lip are made from a different material than the upper lip segment and the lower lip segment; and wherein the partial upper lip and the partial lower lip are made from a food-grade elastomer.

3. A screen assembly for a vibratory separator comprising:
a rigid peripheral frame having an outwardly extending flange, wherein the flange has a flange upper surface and a flange lower surface terminating at a flange periphery;
a screen cloth affixed to the peripheral frame;
a gasket encapsulating a peripheral edge of the flange on the peripheral frame, wherein the gasket comprises:
an outer peripheral section surrounding the flange periphery, wherein the outer peripheral section is made from an elastomer having a filler material, said filler material being sufficiently conductive to block transmission of RF signals;
an upper lip extending inward from the outer peripheral section to cover a portion of the flange upper surface;
a lower lip extending inward from the outer peripheral section to cover a portion of the flange lower surface;
an upper lip segment projecting inward to partially cover the flange upper surface;
a lower lip segment projecting inward to partially cover the flange lower surface;
wherein the upper lip includes a partial upper lip made from an white elastomeric material; and
wherein the lower lip includes a partial lower lip made from a white elastomeric material;
wherein the partial upper lip and the partial lower lip are made from a different material than the upper lip segment and the lower lip segment; and wherein the partial upper lip and the partial lower lip are made from a food-grade elastomer.

4. A screen assembly for a vibratory separator comprising:
a rigid peripheral frame having an outwardly extending flange, wherein the flange has a flange upper surface and a flange lower surface terminating at a flange periphery;
a screen cloth affixed to the peripheral frame;
a gasket encapsulating a peripheral edge of the flange on the peripheral frame, wherein the gasket comprises:
  an outer peripheral section surrounding the flange periphery, wherein the outer peripheral section is made from an elastomer having a filler material, said filler material being sufficiently conductive to block transmission of RF signals;
  an upper lip extending inward from the outer peripheral section to cover a portion of the flange upper surface; and
  a lower lip extending inward from the outer peripheral section to cover a portion of the flange lower surface;
  wherein the outer peripheral section comprises:
    an upper lip segment projecting inward to partially cover the flange upper surface; and
    a lower lip segment projecting inward to partially cover the flange lower surface;
    wherein the upper lip includes a partial upper lip projecting inward from the upper lip segment and contiguously formed therewith;
    wherein the lower lip includes a partial lower lip projecting inward from the lower lip segment and contiguously formed therewith; and
    wherein the partial upper lip and the partial lower lip are each formed from a white elastomeric material;
    wherein the partial upper lip and the partial lower lip are formed from a different material than the upper lip segment and the lower lip segment.

\* \* \* \* \*